United States Patent
Cooper

(10) Patent No.: US 6,208,059 B1
(45) Date of Patent: Mar. 27, 2001

(54) ROTOR FOR AN ELECTRIC MACHINE, RETAINER FOR RETAINING A WINDING IN A SLOT IN A ROTOR, AND METHOD OF MANUFACTURING A ROTOR

(75) Inventor: John Cooper, Hemel Hempstead (GB)

(73) Assignee: Lucas Industries Limited, London (GB)

( * ) Notice: Subject to any disclaimer, the term of this patent is extended or adjusted under 35 U.S.C. 154(b) by 0 days.

(21) Appl. No.: 09/432,302

(22) Filed: Nov. 2, 1999

(30) Foreign Application Priority Data

Nov. 3, 1998 (GB) ................................................. 9823926

(51) Int. Cl.[7] ..................................................... H02K 3/48
(52) U.S. Cl. .............................................. 310/214; 310/261
(58) Field of Search .................................... 310/214, 215, 310/58, 59.61, 60 R, 261; 29/596–598

(56) References Cited

U.S. PATENT DOCUMENTS

| | | | |
|---|---|---|---|
| 2,858,462 | * 10/1958 | Knaus | 310/214 |
| 4,147,946 | * 4/1979 | Linscott, Jr. et al. | 310/214 |
| 4,829,206 | * 5/1989 | Honshima et al. | 310/214 |
| 4,843,271 | 6/1989 | Shah | 310/217 |
| 4,876,469 | 10/1989 | Khutoretsky et al. | 310/52 |
| 4,896,066 | * 1/1990 | Tomite | 310/214 |
| 6,057,624 | * 5/2000 | Ohtake et al. | 310/214 |

* cited by examiner

*Primary Examiner*—Tran Nguyen
(74) *Attorney, Agent, or Firm*—Ohlandt, Greeley, Ruggiero & Perle, L.L.P.

(57) ABSTRACT

A rotor for an electric machine, the rotor comprising: a rotor body having a plurality of axially extending, circumferentially spaced slots therein; at least one winding conductor disposed in each said slot; and a retainer located in each said slot radially outwardly of the or each said winding conductor for limiting radial outward movement of the or each winding conductor; wherein each retainer has a radially inwardly directed surface configured so as to locate the or each winding conductor in a predetermined position in its respective slot. The invention further resides in a retainer and in a method of manufacturing a rotor.

11 Claims, 2 Drawing Sheets

ROTOR FOR AN ELECTRIC MACHINE, RETAINER FOR RETAINING A WINDING IN A SLOT IN A ROTOR, AND METHOD OF MANUFACTURING A ROTOR

This invention relates to a rotor for an electric machine, a retainer for retaining a winding conductor in a slot in a rotor, and a method of manufacturing a rotor. The invention relates in particular, but not exclusively, to the retention of winding conductors in high speed rotors for aircraft generator applications.

FIG. 1 shows a known form of rotor for a rotary electric machine in which axially extending slots carrying rotor winding conductors 103 are partially closed to retain the conductors by retaining lugs 104, 105 formed as integral parts of the rotor. The lugs 104, 105 are relatively heavy and have been found to have a detrimental effect upon the magnetic properties of the machine. Furthermore, during manufacture of the rotor 101, it is necessary to thread the winding conductors 103 axially through their respective slots 102, which increases the time and effort required to produce the rotor and is potentially damaging to the winding conductors 103 and any insulating lining 106 used inside the slots 102.

As shown in FIG. 2, rotors for electric machines are also known which have longitudinal slots 201 in which conductor bars 202 are held against centrifugal acceleration by dovetail wedges 203 of high strength metal alloy. However, the wedges 203 of rotor 204 shown in FIG. 2 are relatively heavy, and have stress concentration points 205, 206 at the edges of the wedge and in the body of the rotor, which tend to weaken the rotor.

The invention seeks to overcome or mitigate at least some of the above mentioned problems.

Accordingly the invention provides a rotor for an electric machine, the rotor comprising: a rotor body having axially extending, circumferentially spaced slots therein; at least one winding conductor disposed in each said slot; and a retainer located in each said slot radially outwardly of the or each said winding conductor for limiting radial outward movement of the or each winding conductor; wherein each retainer has a radially inwardly directed surface configured so as to locate the or each winding conductor in a predetermined position in its respective slot.

This predetermined position may be centred within the slot in the circumferential direction of the rotor.

Each retainer is conveniently substantially crescent-shaped, viewed in lateral cross-section through the rotor and the inwardly directed surface of the retainer is the concave surface of the crescent. The or each winding conductor may be substantially circular in cross-section.

Conveniently, the circumferential extent of each slot is such as to accommodate only one winding conductor.

The invention also includes a rotor for an electric machine, the rotor comprising: a rotor body having axially extending, circumferentially spaced slots therein; at least one winding conductor disposed in each said slot; and a retainer located in each said slot radially outwardly of the or each said winding conductor for limiting radial outward movement of the or each winding conductor; wherein the retainer presents no axially extending corners to the wall of the slot in which it is located.

Each slot may conveniently be defined by a continuous surface, which surface is curved where it mates with the retainer. Such a construction facilitates the avoidance of acute, stress inducing angles which tend to weaken the rotor.

The invention also includes a rotor for an electric machine, the rotor comprising: a rotor body having axially extending, circumferentially spaced slots therein; at least one winding conductor disposed in each said slot; and a retainer for limiting radial outward movement of the or each winding conductor; wherein said slots each have a radially outwardly directed mouth for permitting radial insertion of the or each winding conductor therethrough, the retainer and a surface of the respective slot each being configured so as to permit radial insertion of the retainer into the slot and secure location of the retainer in a position radially outwardly of the or each said winding conductor within the slot.

Preferably, the retainer is securely located in said position by rotation about its longitudinal axis following insertion into said slot. The retainer may be substantially kidney shaped in lateral cross-section and may be made from a substantially lighter material than the rotor body.

The invention also includes a retainer for retaining a winding conductor in a slot in a rotor, the retainer being elongate and substantially kidney shaped in lateral cross-section. The retainer may conveniently be made of plastics material.

The invention also includes a method of manufacturing a rotor for an electric machine, comprising the steps of: preforming a winding conductor; disposing the winding conductor in a slot in the rotor; and fitting a retainer in said slot in a position radially outwardly of the winding conductor.

Conveniently, the or each retainer is fitted by inserting it radially inwardly into its respective said slot, then securely locating it in said position, preferably by rotating it about its longitudinal axis.

In order that the invention may be better understood, two embodiments thereof will now be described, by way of example only, with reference to the accompanying drawings, wherein.

Figure 3:
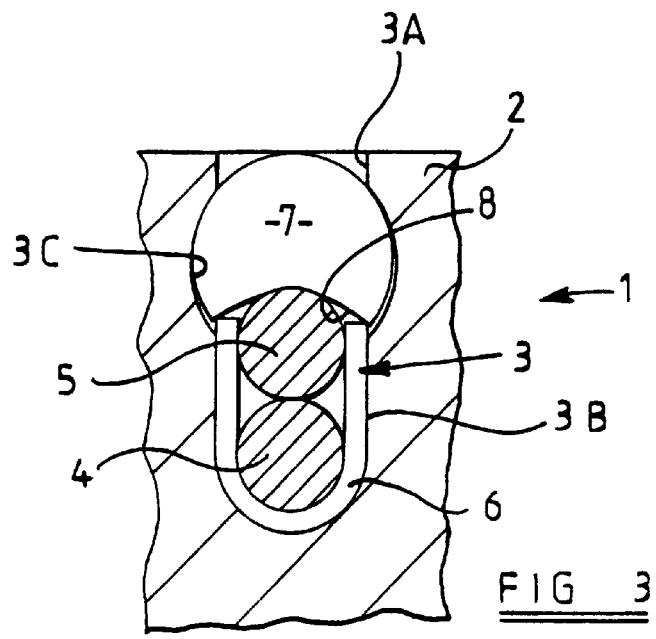
FIG. 3 shows a partial lateral cross-section through a rotor of an electric machine in accordance with one example of the present invention.

A rotor 1, part shown in lateral cross-section in FIG. 3, comprises a rotor body 2 having 84 closely circumferentially spaced, radially directed, axially extending slots 3 therein. Only one of the slots 3 is shown in FIG. 3. The rotor body 2 conveniently takes the form of a stack of appropriately shaped elements which are laminated together, for example by welding or using an appropriate adhesive. Each of the slots 3 contains two conductive windings, a radially inner winding conductor 4 and a radially outer winding conductor 5. Each winding conductor 4, 5 comprises a single-turn copper coil. A layer of insulating material, for example a polyimide film, or an appropriately shaped insulating member 6 is provided between the rotor body 2 and the winding conductors 4, 5.

Each slot 3 comprises a mouth 3A opening to the outer periphery of the rotor body 2, a winding-receiving portion 3B, and an enlarged, retainer-receiving portion 3C intermediate the mouth 3A and the winding—receiving portion 3B. The intermediate portion 3C contains a retainer 7 disposed radially outwardly of the winding conductors 4, 5. The retainer 7 is elongate, of generally the same length as its respective slot, and is substantially crescent shaped in cross-section. The retainer presents its part-circular concave surface 8 to the radially outer winding conductor 5, such that when the winding conductors are subjected to centrifugal force caused by high speed rotation of the rotor, the retainer 7 limits radially outward movement of the winding conductors and, moreover, tends to centre the radially outer winding conductor 5 within the slot 3 in the circumferential direction of the rotor. This may facilitate the passage of cooling fluid around the conductors within the slot, and improves the balance of the rotor.

The retainer 7 is of plastics material, for example glass fibre filled PEEK, and presents no axially extending pointed corners internally of the slot 3 in which it is located, the co-action of the convex outer surface of the retainer with the correspondingly shaped region 3C of its respective slot holding the retainer in position in the rotor. The avoidance of sharp corners minimises the risk of damage to the face of the slot and the winding conductor 5 during insertion of the retainers 7 into the slots, and the relative softness of plastics material enhances this effect.

As clearly seen in FIG. 3, the mouth 3A of the slot 3 is wide enough in the circumferential direction of the rotor 1 to permit radial insertion of the winding conductors 4, 5 therethrough. This permits an improved method of manufacture of the rotor 1, wherein each winding conductor 4, 5 is preformed on a jig and subsequently dropped radially into place in the respective slot 3 after having located the insulating members or formed the insulating layer 6 in the slots 3. Each retainer 7 is normally thereafter inserted axially into the location shown in FIG. 3. As clearly shown in FIG. 3, the larger diameter part-circular convex periphery of the retainer 7 engages the intermediate portion 3C of the slot 3 such that a centrifugal force exerted on the radially outer winding conductor 5 tends to force these mating faces of the slot and the retainer together in self locking fashion.

Figure 1:
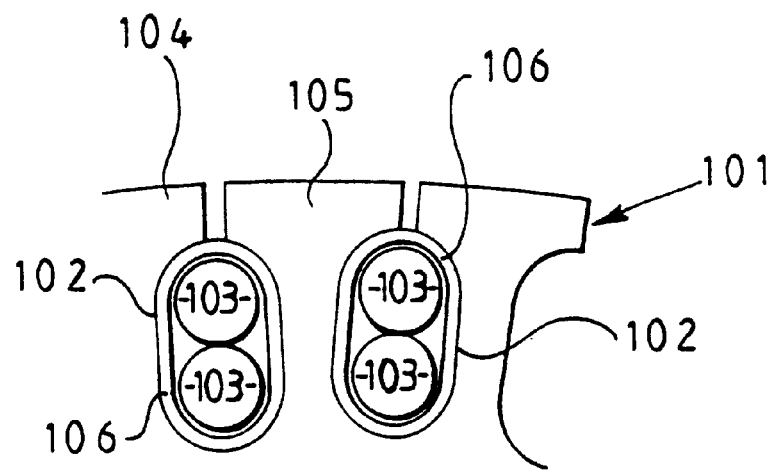
FIG. 1 shows a first known type of rotor, described above.
Figure 2:
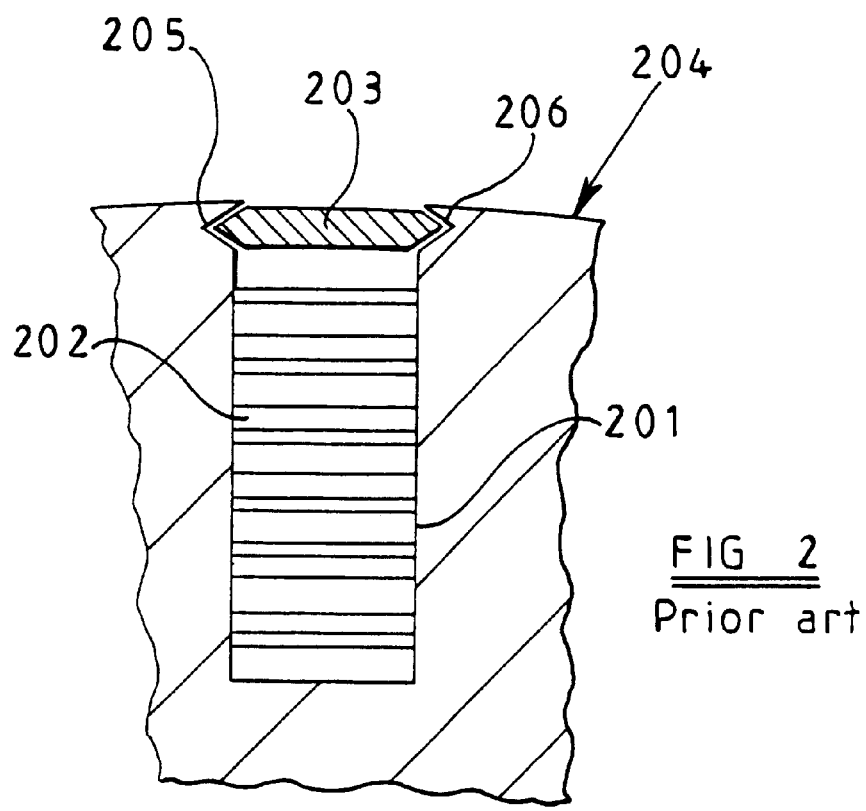
FIG. 2 shows another known type of rotor also described above.

The use of a lighter, plastics retainer 7 instead of the lugs 104, 105 shown in FIG. 1 provides a lighter rotor 1 which is particularly advantageous for use in aircraft applications. The use of the part-circular cut out surface 8 in the retainer 7 permits a shorter winding receiving portion 3B of the slot 3 to be used.

Figure 4:
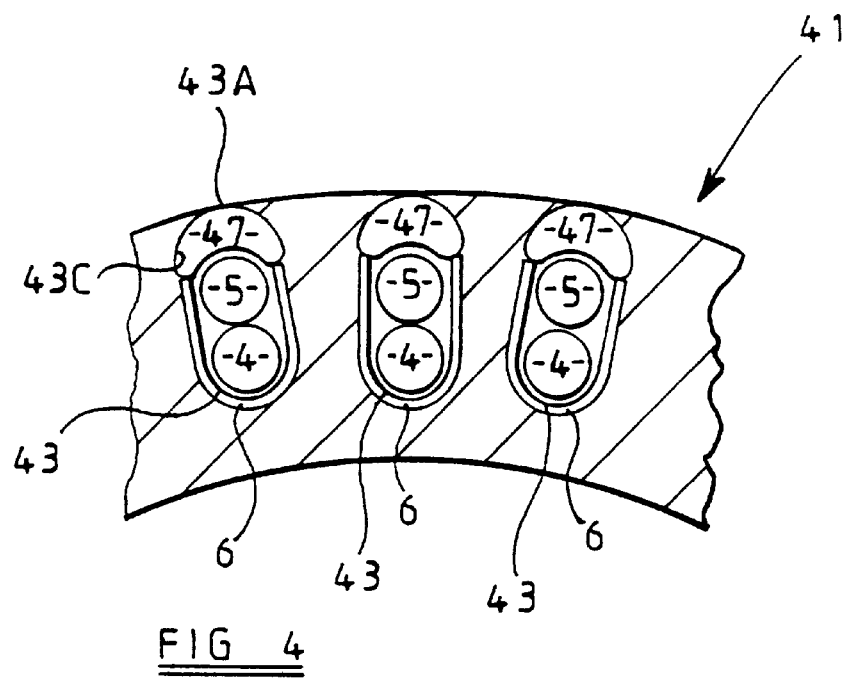
FIG. 4 shows a partial lateral cross-section through a rotor of an electric machine in accordance with a second example of the present invention.

FIG. 4 shows another rotor 41 which is similar in most respects to the rotor 1 shown in FIG. 3, except that a particularly advantageous form of retainer 47 is shown. Features of the rotor 41 which are identical to features already described with respect to FIG. 3 are given the same reference numerals in FIG. 4. As clearly seen in FIG. 4, the retainer 47 is more kidney shaped than the retainer 7 of FIG. 3, having a more rounded profile at the tips of the crescent than the retainer of FIG. 3. Moreover, retainer 47 is adapted to cooperate with the mouth 43A and retainer-receiving portion 43C of the slot 43 so as to allow insertion of the retainer 47 radially into the slot 43. Thereafter the retainer is located securely in position by rotating it about its longitudinal axis.

The exemplary rotors 1, 41 are provided with field windings 4, 5 and are suitable for use in high speed generators for normal operation at about 24000 rpm, with occasional overspeed situations. However, it is to be understood that the invention is not limited to generators or to high speed machines, and that electric motors and lower speed machines are specifically contemplated.

I claim:

1. A rotor for an electric machine, the rotor comprising:
   a rotor body having a plurality of axially extending, circumferentially spaced slots therein;
   at least one winding conductor disposed in each said slot; and
   a retainer located in each said slot radially outwardly of said at least one winding conductor for limiting radial outward movement of said at least one winding conductor;
   wherein each retainer has, in lateral cross-section, a radially inwardly presented concave surface and a radially outwardly presented convex surface, said convex surface and said concave surface having their centres of curvature spaced apart such that the thickness of the retainer in its central region exceeds the thickness of the retainer in its marginal regions, and said concave inner surface of said retainer co-operates with said at least one winding conductor to locate said at least one winding conductor in a predetermined position in its respective slot.

2. A rotor as claimed in claim 1, wherein said retainer surface is configured so that said conductor is centred within the slot in the circumferential direction of the rotor.

3. A rotor as claimed in claim 1, wherein each retainer is substantially crescent-shaped in lateral cross-section and the inwardly directed surface of the retainer is the concave surface of the crescent.

4. A rotor as claimed in claim 1, wherein said at least one winding conductor is generally circular in cross-section.

5. A rotor as claimed in claim 1, wherein the circumferential extent of each slot is such as to accommodate only one winding conductor.

6. A rotor for an electric machine, the rotor comprising:
   a rotor body having axially extending, circumferentially spaced slots therein;
   at least one winding conductor disposed in each said slot; and
   a retainer located in each said slot radially outwardly of said at least one winding conductor for limiting radial outward movement of said at least one winding conductor,
   wherein each said retainer has, in lateral cross-section, a radially inwardly presented concave surface and a radially outwardly presented convex surface, said convex surface and said concave surface having their centres of curvature spaced so that the retainer has a greater thickness in its central region than in its opposite marginal regions, and said retainer presenting no axially extending corners to the wall of the slot in which it is located.

7. A rotor as claimed in claim 1, wherein each slot is defined by a continuous surface curved where said slot mates with the retainer.

8. A rotor for an electric machine, the rotor comprising:
   a rotor body having a plurality of axially extending, circumferentially spaced slots therein;
   at least one winding conductor disposed in each said slot; and
   a retainer for limiting radial outward movement of said at least one winding conductor,
   wherein each said retainer has, in lateral cross-section, a radially inwardly presented concave surface and a radially outwardly presented convex surface, the centres of curvature of said concave surface and said convex surface being spaced so that said retainer has a thickness, in a central region, which exceeds its thickness in the opposite marginal regions of the retainer, and said slots each have a radially outwardly directed mouth for permitting radial insertion of said at least one winding conductor therethrough, said retainer and a surface of said respective slot each being configured so as to permit radial insertion of said retainer into said slot and secure location of said retainer in a position radially outwardly of said at least one winding conductor within said slot.

9. A rotor as claimed in claim 8, wherein the retainer is securely located in said position by rotation about its longitudinal axis following insertion into said slot.

10. A retainer for retaining a winding conductor in a slot in a rotor, the retainer being elongate and having, in lateral cross-section, a concave surface and an opposite, convex surface, the centres of curvature of said convex surface and said concave surface respectively being spaced so that said retainer has a thickness in its central region which exceeds its thickness in the marginal regions on opposite sides, respectively, of said central region.

11. A retainer as claimed in claim 10 wherein the longitudinally extending lateral edges of said elongate retainer are rounded.

* * * * *